US012651195B2

(12) United States Patent
Tommasi et al.

(10) Patent No.: US 12,651,195 B2
(45) Date of Patent: Jun. 9, 2026

(54) SELF-IMPROVING BAYESIAN NETWORK LEARNING

(71) Applicant: INTERNATIONAL BUSINESS MACHINES CORPORATION, Armonk, NY (US)

(72) Inventors: Pierpaolo Tommasi, Dublin (IE); Debasis Ganguly, Dublin (IE); Stephane Deparis, Dublin (IE); Alessandra Pascale, Castleknock (IE)

(73) Assignee: International Business Machines Corporation, Armonk, NY (US)

( * ) Notice: Subject to any disclaimer, the term of this patent is extended or adjusted under 35 U.S.C. 154(b) by 1277 days.

(21) Appl. No.: 17/122,038

(22) Filed: Dec. 15, 2020

(65) Prior Publication Data

US 2022/0188693 A1     Jun. 16, 2022

(51) Int. Cl.
*G06N 20/00*          (2019.01)
*G06N 7/01*           (2023.01)

(52) U.S. Cl.
CPC .............. *G06N 20/00* (2019.01); *G06N 7/01* (2023.01)

(58) Field of Classification Search
None
See application file for complete search history.

(56) References Cited

U.S. PATENT DOCUMENTS 7,593,906 B2     9/2009  Chickering
8,156,062 B2     4/2012  Cho 9,361,588 B2 *   6/2016  Klopotek ................. G06N 7/01
10,157,226 B1    12/2018 Costabello
10,380,500 B2 *  8/2019  Miao ......................... G06F 8/65
2002/0042793 A1  4/2002  Choi
2007/0288419 A1  12/2007 Strassner
(Continued)

FOREIGN PATENT DOCUMENTS

CN          102243659 A     11/2011
CN          102360457 A     2/2012
(Continued)

OTHER PUBLICATIONS

Kochurov, Max, et al. "Bayesian incremental learning for deep neural networks." arXiv preprint arXiv:1802.07329 (2018). (Year: 2018).*

(Continued)

*Primary Examiner* — Omar F Fernandez Rivas
*Assistant Examiner* — Chaitanya R Jayakumar
(74) *Attorney, Agent, or Firm* — Anthony Curro

(57)          ABSTRACT

A method, a computer system, and a computer program product for creating multiple models asynchronously is provided. Embodiments of the present invention may include receiving input data, wherein input data includes a full training dataset. Embodiments of the present invention may include building, asynchronously, one or more Bayesian network models using one or more portions of the input data on a first pipeline and building a free learning model using the full training dataset on a second pipeline. Embodiments of the present invention may include retrieving the one or more Bayesian network models from the first pipeline. Embodiments of the present invention may include retrieving the free learning model from the second pipeline.

18 Claims, 6 Drawing Sheets

(56) References Cited

U.S. PATENT DOCUMENTS

| | | | |
|---|---|---|---|
| 2014/0181128 A1 | 6/2014 | Riskin | |
| 2017/0132528 A1* | 5/2017 | Aslan | G06N 20/00 |
| 2019/0197139 A1* | 6/2019 | Yang | G06F 16/212 |
| 2020/0125956 A1* | 4/2020 | Ravi | G06N 3/045 |

FOREIGN PATENT DOCUMENTS

| | | |
|---|---|---|
| CN | 109886577 A | 6/2019 |
| IN | 101770453 A | 7/2010 |
| KR | 100779086 B1 | 5/2007 |
| WO | 2019182755 A1 | 9/2019 |

OTHER PUBLICATIONS

Mnih, Volodymyr, et al. "Asynchronous methods for deep reinforcement learning." International conference on machine learning. PMLR, 2016. (Year: 2016).*

Luo, Jiebo, Andreas E. Savakis, and Amit Singhal. "A Bayesian network-based framework for semantic image understanding." Pattern recognition 38.6 (2005): 919-934. (Year: 2005).*

Leon, Florin, and Marius Gavrilescu. "A review of tracking, prediction and decision making methods for autonomous driving." arXiv preprint arXiv:1909.07707 (2019). (Year: 2019).*

Hruschka Jr, Estevam R., and Nelson FF Ebecken. "Towards efficient variables ordering for Bayesian networks classifier." Data & Knowledge Engineering 63.2 (2007): 258-269. (Year: 2007).*

Karami, Amin, and Ronnie Johansson. "Utilization of multi attribute decision making techniques to integrate automatic and manual ranking of options." Journal of information science and engineering 30.2 (2014): 519-534. (Year: 2014).*

Nazari, Mohammadreza, et al. "Don't Forget Your Teacher: A Corrective Reinforcement Learning Framework." arXiv preprint arXiv:1905.13562 (2019). (Year: 2019).*

Samadi, Yassir, Mostapha Zbakh, and Claude Tadonki. "Performance comparison between Hadoop and Spark frameworks using HiBench benchmarks." Concurrency and Computation: Practice and Experience 30.12 (2017): e4367. (Year: 2017).*

Ionescu, Radu Cristian. "Revisiting large scale distributed machine learning." arXiv preprint arXiv:1507.01461 (2015). (Year: 2015).*

Yu, Shipeng, et al. "Bayesian co-training." Advances in neural information processing systems 20 (2007). (Year: 2007).*

Devitt, et al., "Constructing Bayesian Networks Automatically Using Ontologies," Applied Ontology, IOS Press, 1570-5838/06, https://pdfs.semanticscholar.org/1a12/71a32932d5b16e27e45940b662581d622bd1.pdf, 2006, pp. 1-11.

Fenz, "An Ontology-Based Approach for Constructing Bayesian Networks," Science Direct, Data & Knowledge Engineering, vol. 73, https://www.sciencedirect.com/science/article/abs/pii/S0169023X11001583?via%3Dihub, Mar. 2012, 2 pages.

Liu, et al., "A Framework for Ontology-Driven Subspace Clustering," KDD'04, Aug. 22-25, 2004, Seattle, Washington, USA, Copyright 2004 ACM, pp. 623-628.

Luo, et al., "A Bayesian Network-Based Framework for Semantic Image Understanding," Elsevier Ltd., Pattern Recognition, 38, (2005), pp. 919-934, The Journal of the Pattern Recognition Society.

Miao, et al., "Ontology-Based User Preferences Bayesian Model for Personalized Recommendation," Semantic Scholar, Corpus ID: 17111333, https://www.semanticscholar.org/paper/Ontology-based-User-Preferences-Bayesian-Model-for-Miao-Jin/ff6612dbd3fa1825e36f9ac10788eb7897964643, 2013, pp. 1-3.

Mittleman, et al., "A Bayesian Generative Model for Learning Semantic Hierarchies," Frontiers in Psychology, vol. 5, Article 417, May 2014, pp. 1-9.

Pham, et al., "Unsupervised Training of Bayesian Networks for Data Clustering," Proceedings of the Royal Society A, https://royalsocietypublishing.org/doi/pdf/10.1098/rspa.2009.0065, Jul. 8, 2009, pp. 1-22.

Zheng, et al., "An Ontology-Based Bayesian Network Approach for Representing Uncertainty in Clinical Practice Guidelines," URSW'07: Proceedins of the Third International Conference on Uncertainty Reasoning for the Semantic Web, vol. 327, Nov. 2007, 16 pages.

Mell et al., "The NIST Definition of Cloud Computing", Recommendations of the National Institute of Standards and Technology, Special Publication 800-145, Sep. 2011, 7 pages.

* cited by examiner

100

300

Receive Input 302

Build Multiple Models Using a Dataset 304

Build Free Learning Model Using a Full Dataset 306

Retrieve Models From Fast Pipeline and Slow Pipeline 308

Rank Models 310

Provide Confidence Scores 312

900

902a, b
Internal Components 904a, b
External Components

906 — PROCESSOR(S)

912

908 — RAM(S)

910 — ROM(S)

COMPUTER READABLE
STORAGE MEDIA 915
– OPERATING SYSTEM(S) 914
– APPLICATION PROGRAMS 915

916

930
DEVICE
DRIVERS

918
R/W
DRIVE OR
INTERFACE

922
NETWORK
ADAPTER OR
INTERFACE

924

926

928

PORTABLE
COMPUTER
READABLE
STORAGE
MEDIA

920

TO NETWORK

SELF-IMPROVING BAYESIAN NETWORK LEARNING

BACKGROUND

The present invention relates generally to the field of computing, and more particularly to machine learning. Bayesian networks are a type of machine learning model that consist of a graph structure and probabilistic numerical information. Creating one or more models may be time intensive, and depending on which type of learning is used, many times the models that learn faster are less accurate and the models that take more time to learn are more accurate. Learning a graph structure with many variables may be substantially time intensive.

SUMMARY

Embodiments of the present invention disclose a method, a computer system, and a computer program product for creating multiple models asynchronously. Embodiments of the present invention may include receiving input data, wherein input data includes a full training dataset. Embodiments of the present invention may include building, asynchronously, one or more Bayesian network models using one or more portions of the input data on a first pipeline and building a free learning model using the full training dataset on a second pipeline. Embodiments of the present invention may include retrieving the one or more Bayesian network models from the first pipeline. Embodiments of the present invention may include retrieving the free learning model from the second pipeline.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
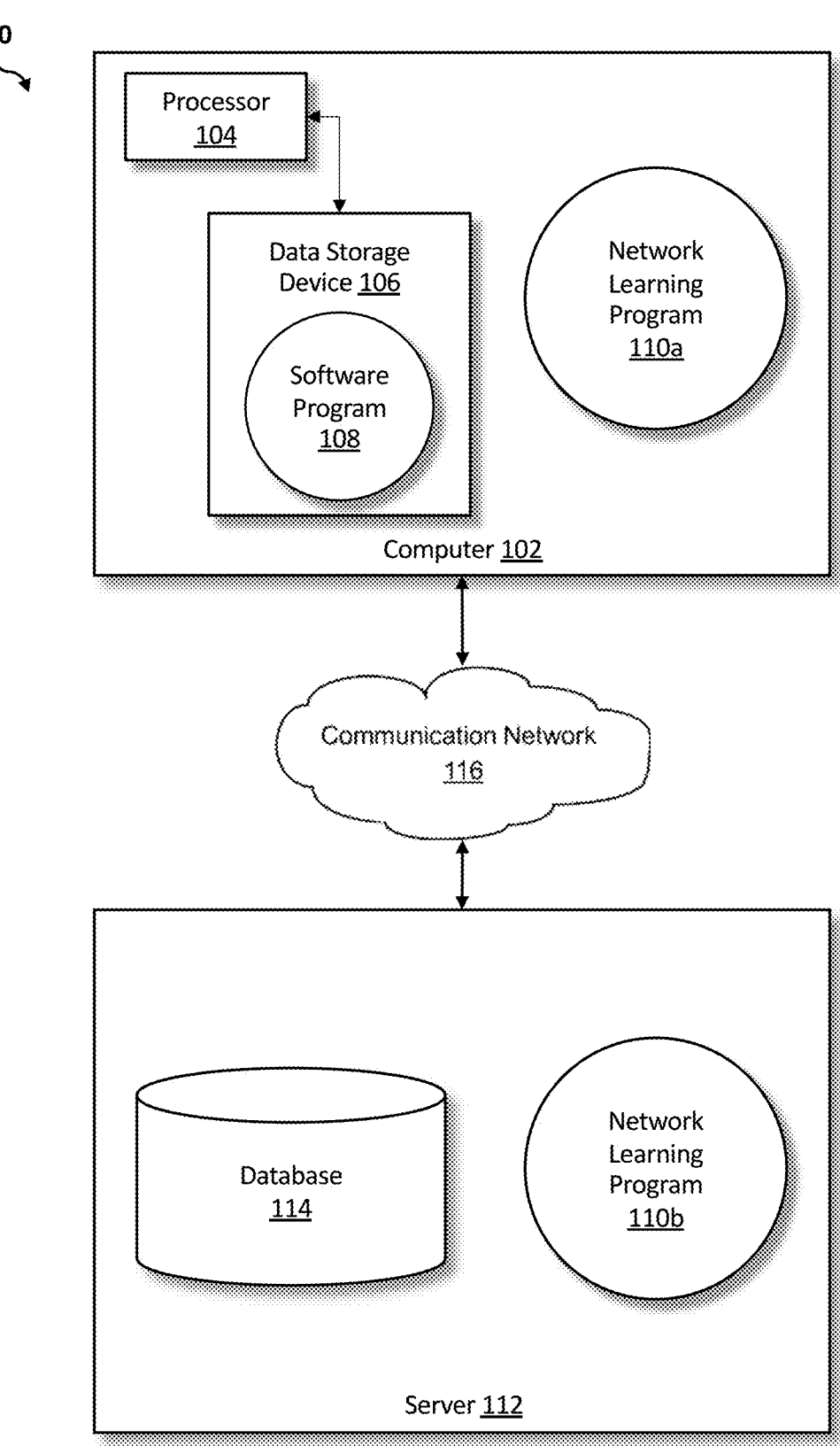
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, Bayesian networks are a type of machine learning model that consist of a graph structure and probabilistic numerical information. The graphs represent variables and the conditional dependencies of the variables. Creating one or more models may be time intensive, and depending on which type of learning is used, many times the models that are faster to learn are less accurate and the models that take more time to learn are more accurate. For example, learning a graph structure with many variables may be substantially time intensive. Current limitations, given a time requirement, typically may include a graph structure that is learned one time and conditional probabilities tables (CPTs) are only updated when new data is available. Thus, the graph that was learned, over time, is not updated when new data becomes available in the conditional probabilities tables (CPTs). Therefore, the current limitation results in a less accurate model over time.

Additionally, if domain knowledge is used to add constraints to speed up the learning process, the result could include an increase in bias of the model over time. Alternatively, when no domain knowledge is provided or used, a Bayesian network algorithm focuses on creating only one model that either purely uses data but requires more time or uses a modern approach to make use of ontologies. Using the approach to make use of ontologies to ingest knowledge and speed up the model learning process will create a risk of obtaining less accuracy from the model. This approach can also be negatively affected from the ontology itself, such as the ontology containing incorrect implicit assumptions that contradict the data. Thus, choosing between the two methods of using domain knowledge or not using domain knowledge impose a trade-off between model learning time and model accuracy. Therefore, it may be advantageous to, among other things, provide a solution that builds multiple temporary models quickly and builds the temporary models concurrently with building a more accurate model.

The following described exemplary embodiments provide a system, a method and a program product for learning Bayesian network models. As such, embodiments of the present invention have the capacity to improve the technical field of network learning by building two model pipelines that simultaneously learn using two different methods. More specifically, an asynchronous forking may be used that builds two pipelines in which one pipeline builds and trains one or more temporary models using ontologies and another pipeline builds and trains one model that purely relies on a full dataset. The temporary models use taxonomies or ontologies to speed up the availability of results. The model that relies purely on data will take more time to build and, in the meantime, the temporary model may be used. As more accurate models become available, the most accurate model from either pipeline may be used for predictive results.

According to an embodiment, various types of Bayesian network models may be trained, built and used to create predictive results. Data or information from different industries that provide services and microservices that rely on Bayesian network model predictions may be obtained from many different sources, ontologies and domains or domain knowledge. Different sources and domains may be related to, for example, corporate services, software services, legal services, medical services, automotive services, utility services, emergency services, weather services, news services, non-profit rescue services, social media, regional services, government services, equipment services, food supply services and academic services.

Data collected and received for the various domains may be used as datasets for training, building, running and fine-tuning Bayesian network models. The collected data may be used for analysis and added to a corpus or a database that stores the training data, the predictive results, the feedback data and the model performance data. The collected data may, for example, be received from various devices through a communication network, such as computing devices, servers, internet of things (IoT) devices, global positioning system (GPS) devices, sensors, smart watches, smart phones, smart tablets, personal computers or automotive devices. Data collected for training models may also include data obtained from ontology or domain databases.

Many different machine learning (ML) models may be used, including deep learning models, artificial intelligence (AI) models, neural networks, artificial neural networks (ANNs) and regression models. The focus will be on Bayesian network models and the term model may be used to indicate a Bayesian network model. The model may be used, for example, to learn the relationships among variables to learn graph structures or to apply a graph structure on data to learn conditional probabilities tables (CPTs).

Training and updating a model may include supervised, unsupervised and semi-supervised model learning. Supervised learning may use a labeled dataset or a labeled training set to build, train and update a model. Unsupervised learning may use all unlabeled data to train a model. Semi-supervised learning may use both labeled datasets and unlabeled datasets to train a model. Supervised learning and semi-supervised learning may incorporate feedback or ground truth by having an individual check the accuracy of the data, data labels and data classifications. Individuals may be a user, a subject matter expert (SME) or a domain expert who has extensive knowledge in the particular domain of the dataset. The subject matter expert (SME) input may represent ground truth for the model learning and the provided ground truth in a feedback loop may raise the accuracy and the predictive capabilities of the model. The user or the subject matter expert (SME) may correct, amend, update or remove the classification of the data or data labels by manually updating the labeled dataset. Incorporating feedback to the model from users or subject matter experts (SMEs) improve the accuracy of the model as datasets are updated or corrected.

Natural language processing (NLP) may be used during the building and training of a model using both structured and unstructured data to be incorporated into the model learning process. Natural language processing (NLP) may be used to analyze the quality of data or feedback that is received for training and model building. Natural language processing (NLP) may also be used to process unstructured data and derive structured data used to learn a Bayesian network. Structured data may include data that is highly organized, such as a spreadsheet, a relational database or data that is stored in a fixed field. Unstructured data may include data that is not organized and has an unconventional internal structure, such as a portable document format (PDF), an image, a presentation, a webpage, video content, audio content, an email, a word processing document or multimedia content. Features may be extracted from ontologies and semantic relationships are used to put constraints on the model learning, thus, optimizing the learning phase of the Bayesian network. Features in a medical field may include, for example, symptoms of a disease or types of diseases.

According to an embodiment, a proposed two pipeline learning system allows a given input dataset in one pipeline and any domain knowledge, such as an available ontology, in another pipeline to concurrently build multiple models. For example, domain knowledge or ontologies may be used to build a Bayesian network by creating one pipeline that can build multiple models. The first pipeline may build one or more models quickly by building the models using ontologies for a fast output or prediction. Multiple models may be built quickly to solve the same problem or to provide predictive results for a same industry inquiry using domain knowledge. The multiple models in the first pipeline may be considered temporary models that are built, and the best one can be chosen for use. Concurrently, the second pipeline may build one model not using Apriori knowledge (i.e., the second pipeline may not use information, such as ontologies) or by using less Apriori knowledge than the first pipeline. The second pipeline model may be built using a more classical Bayesian network model learning approach and have feedback loop capabilities to improve the learning process. A feedback loop may also be used when building the temporary models, however, the feedback loop may be an optional component such that a model may be produced quickly before a feedback loop is used, and then the model can be updated if a feedback loop is used.

According to an embodiment, Bayesian network models may be built and utilized by using differing methods for the purpose of obtaining results quickly and accurately. Two pipelines may be built such that each pipeline will create one or more models that are trained and used at the same time. These two pipelines may include non-sequential model learning and training (i.e., concurrent model learning and training). One pipeline may be known as the fast pipeline that represents fast model learning and the other pipeline may be known as the slow pipeline that represents a comprehensive model learning. The fast pipeline may build one or more models and the slow pipeline may build one model concurrently with the multiple models in the fast pipeline.

The term fast pipeline may be used to represent the pipeline that builds models for the purpose of achieving fast results potentially at the expense of accuracy. The term slow pipeline may be used to represent the pipeline that builds models for the purpose of achieving more computationally extensive and accurate results. Although both pipelines may receive a level of accuracy with the results, the purpose of having two concurrently model building pipelines is to achieve results quickly, with enough or an acceptable amount of accuracy, and then an improvement of results as the concurrent models continue building over time. The term fast may represent building models, for example, using ontologies or taxonomies that are faster to build than a model that relies on data only, with significantly more data to build from scratch.

The fast building models may be highly accurate as well and if so, the model collector and model ranker will identify or compare the accuracy. Typically, models built over time and using a large amount of data that does not contain information that is dependent on specific ontologies may provide a higher accuracy in results. The fast pipeline may both build fast models and achieve a high level of accuracy and this may be dependent on the type of information and the amount of information that is presented in a specific domain and in a specific ontology. The fast pipeline builds models faster than the slow pipeline and the accuracy can vary based on the datasets used to train the models in both pipelines. The purpose for labeling the pipelines as fast and slow is to show that the fast pipeline may always build one or more models faster than the slow pipeline. The pipelines may be called a first pipeline and a second pipeline. The first pipeline may represent the fast pipeline and the second pipeline may represent the slow pipeline.

As an example, a Bayesian network-based model or algorithm ingests training data to create models and the learning or training phase of the model includes two non-sequential iterative tasks or pipelines. A Bayesian network or a Bayes network may represent variables and the conditional dependencies of the variables using a graph model that is probabilistic or statistical in nature. The graph model can ingest data and provide a probabilistic graph as a result. Bayesian learning may include machine learning or deep learning model architecture that can be used to create models that infer complex distributions.

One task or pipeline may include building a model that takes a longer amount of time to build to produce highly accurate predictive results (i.e., the slower model in the slow pipeline). The slower and more accurate model may identify relationships among variables and build a graph structure accordingly. The second task or pipeline may include building one or more models in less time (i.e., the faster model in the fast pipeline) than the first task model and may or may not be as accurate in the predictive results. This faster model applies a graph on the data to learn conditional probabilities tables (CPTs). This hybrid approach allows fast access or availability of a model while concurrently working towards a more accurate model that may be provided.

Models that learn or are trained using graph structures may be an exponentially slow process. For example, on a high-end machine, learning the graph structure containing more than 25 variables could easily take multiple days. When a graph structure is already known, the high-end machine may only take a few minutes to learn the conditional probabilities tables (CPTs). In order to limit or reduce the learning time for a model, domain knowledge can be used to add constraints on the relationships among variables. For example, in order to avoid the slower model task or pipeline, one process may include clustering the variables into a small group to learn the sub-graphs. The process of creating clusters of variables and relations between clusters, for example, using ontologies, allows for a faster learning of the graph structure. Then a tree can be learned as opposed to a more general graph. The tree may be learned quickly and much faster than learning a non-tree graph, however, learning the tree may reduce the accuracy of the model, which is expected for the faster model. Once the faster pipeline model learns the tree, edges may be added manually or the whole graph structure may be manually imposed.

Examples of models learning different graph structures may include graph structures being learned by clustering variables, imposing a graph structure, free learning of graph structures and an approximate learning of graph structures, such as using the Chow-Liu algorithm.

Learning graph structures by clustering variables may include imposing cluster constraints that are derived from an ontology to create a graphical representation of the ontology data. For example, clustering variables of ontology data for a medical industry creates nodes based on the ontology data, such as nodes for demographics, nodes for conditions, nodes for behaviors and nodes for symptoms. Demographic nodes may include, for example, age and gender. Conditions nodes may include, for example, hypertension, diabetes, arthritis, lung disease or heart disease. Behaviors nodes may include, for example, social participation or substance usage. Symptoms nodes may include, for example, daily medications, body mass index (BMI), blood pressure, pain medication, pain or an abnormal heart rhythm.

The clustering variables model may be a coarse-grained model that may not be as accurate as a free learning model, however, can be built approximately 90%-95% faster than a free learning model. In the clustering variables model, variables in the same cluster, such as nodes, may not be connected to each other variable. For example, a symptom cannot cause another symptom. This may be considered a model that may be built using the fast pipeline using domain knowledge to build multiple clusters. The network learning program may utilize learning graph structures by clustering variables to be built in the fast pipeline as an option for a temporary model. The multiple clusters, multiple nodes or multiple models that are built may be compared against a more accurate model (i.e., the free learning model in the slow pipeline) and may learn from the more accurate model.

Learning graph structures by imposing a graph structure may include fully imposing a graph structure using domain knowledge from a domain expert or from an ontology, or both. The domain expert may provide a tag or a classification hierarchy to the learning structures. Domain expertise and relationships may also be learned from the input data. The imposed graph structure may be quickly computed and may be a simpler computation than free learning. The result of the imposed graph structure may be biased based on the knowledge of the domain expert, which may be prone to human error, or based on an ontology that may be missing or misinterpreting some node connections. The network learning program may use domain expert knowledge, ontologies, or both, to build multiple temporary models on the fast pipeline and then progressive model improvements may be made and tested or compared against a more accurate model. For example, many models are built within the fast pipeline and the accuracy measures may be attained over time, thus, past models can be used for testing. Domain knowledge may be reflected in the tag hierarchy or domain knowledge may be inferred by relationship representations over time.

Learning graph structures by a free learning of graph structures may include learning completely from data. Free learning may refer to learning free from any constraints. For example, learning the probability of smoking increases the probability of lung cancer based solely on the data of a population. Alternatively, learning with constraints would include constraining the model to represent that smoking increases lung cancer, such as based on what might be considered commonly found information on public databases. Learning completely from data may include ingesting a full dataset for model learning and training. A full dataset may refer to the total available data or the whole amount of available data for a chosen domain. The free learning algorithm may explore or identify all possible combinations of nodes and edges which creates an exponentially larger solution space or solution options. A solution space may refer to the possible or all possible graph structures that are compatible with the data.

For example, exploring 22 variables may take one full day to process. The free learning graph structure may be a most accurate computation, however, the accuracy also requires more time than the fast models. The network learning program may provide the results of the free learning model when the results become available and if the free learning model is the most accurate between all models, the it may become available for use out of the pipeline. While the network learning program is computing the free learning model and, thus, while the free learning model is not yet available, the fast pipeline will be computing one or more temporary models to provide fast results, make inferences and with almost no downtime (i.e., immediate results).

Learning graph structures by using an approximate algorithm, such as the Chow-Liu algorithm, may be a fast model learning and training method, however, the shape of the tree output may be limited compared to other directed acyclic graph (DAG) algorithms. The approximate algorithm model may be limited and may not be a best learning structure in many cases. The Chow-Liu algorithm may be a model that is used for the fast pipeline for comparison against other temporary models.

The network learning program may asynchronously build and provide asynchronously two model pipelines as Bayesian networks that represents a graphical representation of a joint probability distribution of several random variables and uses conditional dependence and independence to simplify a model. The asynchronously building pipelines allow the network learning program to focus on both performance and high or quick availability of models since the models are built in parallel. Additionally, the multiple models available in an output may be provided at the same time, which allows a user to choose a model that best suits the user's needs. For example, the network learning program will provide a model immediately and make the model available to a user for the user to begin benefiting from a quickly built model and immediate results. Then, as time passes, the user can obtain more accurate models that can achieve a more accurate predictive performance and solutions.

The created Bayesian networks from the network learning program may be open to a user tuning the models, however, will provide a set of models to the user that are ranked in output performance. The user may have the ability to immediately access a model and have the ability to choose model configurations that are best suited for the user, thus, being able to have multiple models quickly that the user is able to compare. The dual pipeline approach with one fast pipeline allows no wait time for the user to begin benefiting immediately and to allow the user to update preferences without requiring a model to be recomputed every time the user updates preferences. The user will be able to utilize the models while the slower model has time to build a potentially more accurate model using a full dataset.

Use cases in various domains that rely on building models to produce predictions may require a model to be built quickly. The amount of data obtained from each industry may differ, the amount of data may grow, and the number of variables may change, grow or increase based on the industry. For example, in the healthcare domain, a large amount of healthcare related data may be stored, and current data may be continuously received over a communication network and stored in medical databases. The healthcare industry or a healthcare related company may utilize the network learning program to identify the susceptibility of some chronic conditions, such as diabetes, based on social determinants of health. Different analytics may work together, for example, using analytics identified in a pipeline during model building and analytics identified as an output of the models.

In the healthcare domain, a common scenario may use a Bayesian network to provide a holistic view on a patient even if some patient data is missing. A network learning program that contains a two pipeline approach may build a model in the healthcare domain that may require a lot of time to build such that the whole pipeline of analytics will wait for the Bayesian network to be available (i.e., the model learning is finished) before starting to use the data elements that are incomplete. The faster pipeline may provide one or more simple models that produce a fast response or output. Additionally, the faster pipeline may build multiple models while analytics are not stopped. For example, the faster pipeline may provide fast results to a user that has a mobile application that monitors the patient's health parameters. The faster model may obtain updated health parameters and may be adjusted quickly.

Another use case example may include an insurance industry that uses a Bayesian network to analyze and predict risk assessments, such as claims for drivers that have varying profiles and risk measurements. A common scenario using a Bayesian network may include a failure to identify insurance industry changes quickly or issues in troubleshooting software that insurance companies rely on. The current models in the Bayesian network may be static, for example, troubleshooting by printing out documents. Alternatively, a network learning program may provide the user, for example, with a model that is built using a subset of user-specified ontologies or relationships between features to construct a fast and efficient model to obtain fast results. The user can switch between using the faster model and the complete model (i.e. more computationally intensive model build using a full dataset) output over time.

The network learning program may allow the model to be updated over time and this feature may allow the removal of an initial bias, may automatically adapt to the newly collected data and adapt to new computer hardware, software updates or unforeseen scenarios. An example of an unforeseen scenarios may include industry changes or new trends. The network learning program may provide a quick adaption to new trends to provide faster responses or results. New trends, for example, include new scams, legal changes or updates or car manufacturer issues. If a new trend is not immediately identified, the insurance company may encounter losses, for example, due to a scammer exploiting a loophole the moment the loophole is known or found by a scammer.

Referring to FIG. 1, an exemplary networked computer environment 100 in accordance with one embodiment is depicted. The networked computer environment 100 may include a computer 102 with a processor 104 and a data storage device 106 that are enabled to run a software program 108 and a network learning program 110a. The networked computer environment 100 may also include a server 112 that is enabled to run a network learning program 110b that may interact with a database 114 and a communication network 116. The computer 102 may also be known as a client computer and the server 112 may also be known as a server computer. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with the server 112 via the communications network 116. The communications network 116 may include connections, such as wire, wireless communication links, or fiber optic cables. As will be discussed with reference to FIG. 4, server 112 may include internal components 902a and external components 904a, respectively, and computer 102 may include internal components 902b and external components 904b, respectively. The server 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the network learning program 110a, 110b may interact with a database 114 that may be embedded in various storage devices, such as, but not limited to a computer/mobile device 102, a server 112, or a cloud storage service.

According to the present embodiment, a user operating a computer 102 or a server 112 (e.g., a server computer) may use the network learning program 110a, 110b (respectively) to use two split learning pipelines to provide accurate predictive results. The network learning method is explained in more detail below with respect to FIGS. 2 and 3.

Figure 2:
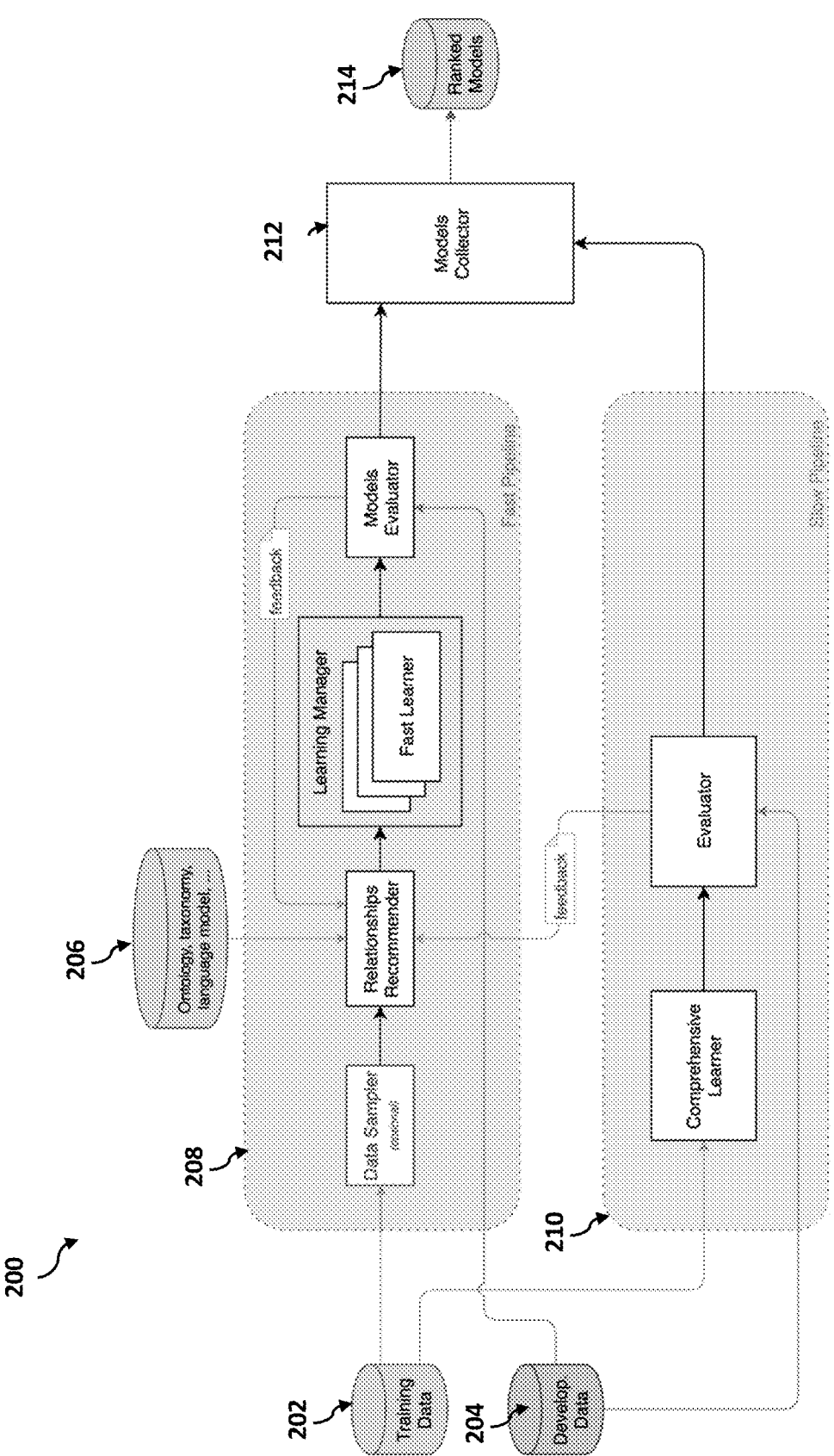
FIG. 2 is an example block diagram of the architecture flow for a self-improving Bayesian network that uses two split learning pipelines to provide both fast and accurate results according to at least one embodiment.

Referring now to FIG. 2, an example block diagram of the architecture flow for a self-improving Bayesian network 200 that uses two split learning pipelines to provide both accurate results used by the network learning program 110a, 110b according to at least one embodiment is depicted. The self-improving Bayesian network 200 architecture includes a training data 202, development data 204, ontology data 206, a fast pipeline 208, a slow pipeline 210, a model collector 212 and ranked models 214.

The training data 202 may include data that is collected, received or accessed and stored in a training database. The training database includes training data 202, such as a spreadsheet or tabular data containing rows of values across columns that correspond to variables for specified domains. The training data 202 may be acquired, obtained or updated over time and may be used for training purposes. The training database may transmit training data 202 to both pipelines, the fast pipeline 208 and the slow pipeline 210. The development data 204 may include data that is assigned to a certain subset of data, such as data that is well known, feedback data or data that is considered ground truth. The development data 204 may include data that is collected, received or accessed and stored in a development database. The development database includes development data 204, such as data from the same domain sources that provided the training data, however, the development data 204 may be stored in a separate database for testing and not learning or training purposes. The development database may transmit development data 204 to both pipelines, the fast pipeline 208 and the slow pipeline 210.

The ontology data 206 may include data that is collected, received or accessed and stored in an oncology database. The ontology database includes ontology data 206, such as ontologies or taxonomies stored on public databases or, with proper access, on private databases. For example, if a hospital is utilizing the network learning program 110a, 110b, then the hospital may have access to private ontology data that may be used for model building. The ontology database may transmit data to the fast pipeline.

The fast pipeline 208 may include multiple components or modules, such as a data sampler, a relationships recommender, a learning manager that includes a fast learner, a model evaluator and a feedback loop from the model evaluator to the relationships recommender. The fast pipeline 208 may instantiate many different Bayesian network models that focus on speed or fast model building results. Different Bayesian network models may include models that learn or are trained using different sets of constraints or models that learn or are trained using different algorithms, such as Chow-Liu The data sampler may be an optional component that selects only a portion of the dataset or a partial dataset to use for building a model in the fast pipeline 208. The relationships recommender or relationships manager may use one or more external relationship representations, such as an ontology, a taxonomy or a language model, to guess how to connect or how to cluster the different variables together. Connecting the variables with a set of recommended connections or relationships among the variables that are available may reduce the exploration space to compute the network, thus, creating an exponentially faster process for learning the model structure. The relationships recommender may manage relationships and be updated with new data, for example, when new data is available in a conditional probabilities table (CPT). The relationships recommender may update new relationships which allows the model to not be required to be rebuilt from a beginning phase. The network learning program 110a, 110b allows the model to be updated when new data is obtained instead of the model having to be rebuilt.

For example, when a new possible relationship is identified, models typically need to start over and tag the hierarchy changes, however, the network learning model 110a, 110b utilizes the relationships recommender to manage and update new relationships and avoid model downtime to a user due to updated data. Given a set of constraints provided by the relationships recommender, the learning manager may create one or more training instances on the imposed or the cluster network. The relationships recommender may collect feedback from different models and build or maintain relationships between the variables. The learning manager is a component or module that executes one or more learning tasks using the recommended connections or relationships from the relationships recommender. Using the recommended connections for learning tasks exponentially reduces the time to complete the tasks. The model evaluator may evaluate the models received from the learning manager by measuring the models accuracy using the development data 204.

The slow pipeline 210 may include components or modules, such as a comprehensive learner and an evaluator. A feedback loop may also connect the fast pipeline with the slow pipeline. The comprehensive learner may utilize a full dataset to train a model, thus, may potentially require more time for a potential better accuracy. For example, the comprehensive learning may not ignore data and may not have recommended relationships between variables, which would require more time to finish the computation. A full dataset may include the total available data in a chosen domain. A full dataset may also mean using all of the available variables, such as all the columns in a spreadsheet. As a comparison, while the slow pipeline 210 utilizes the full dataset to build a model, the fast pipeline 208 may learn faster by using the relationships recommendations, by having the ability to ignore or reduce the amount of data being processed and by utilizing ontologies. The evaluator may test the model learning phase and produce feedback of the learning. The feedback produced by the evaluator may, for example, include information relating to the change in accuracy from the slow pipeline model compared with the fast pipeline models. The learning feedback may include the evaluator output and may be transmitted to the fast pipeline. The slow pipeline 210 may perform free learning on a full dataset, may take longer to build a model compared to the fast pipeline 208 and may focus on obtaining unbiased and highly accurate results.

The model collector 212 may receive models from both pipelines and produce confidence scores for each model that may be returned to one or both pipelines or transmitted to the ranked models 214 database. The confidence score may be computed by measuring the accuracy of the model using the development data 204. The confidence score may also be computed by considering metadata, such as a confidence score that may be available to measure the accuracy of an ontology used in the fast pipeline 208. Storing the built models' progression over time with model metadata may allow downstream components to have better artificial intelligence (AI) process insights and may allow a user to choose the best model to fit the use case. The ranked models 214 may be collected in a ranked model database and may receive built model data from the model collector 212.

Figure 3:
FIG. 3 is an operational flowchart illustrating a process for a self-improving Bayesian network learning using two split learning pipelines according to at least one embodiment.
Figure 3:
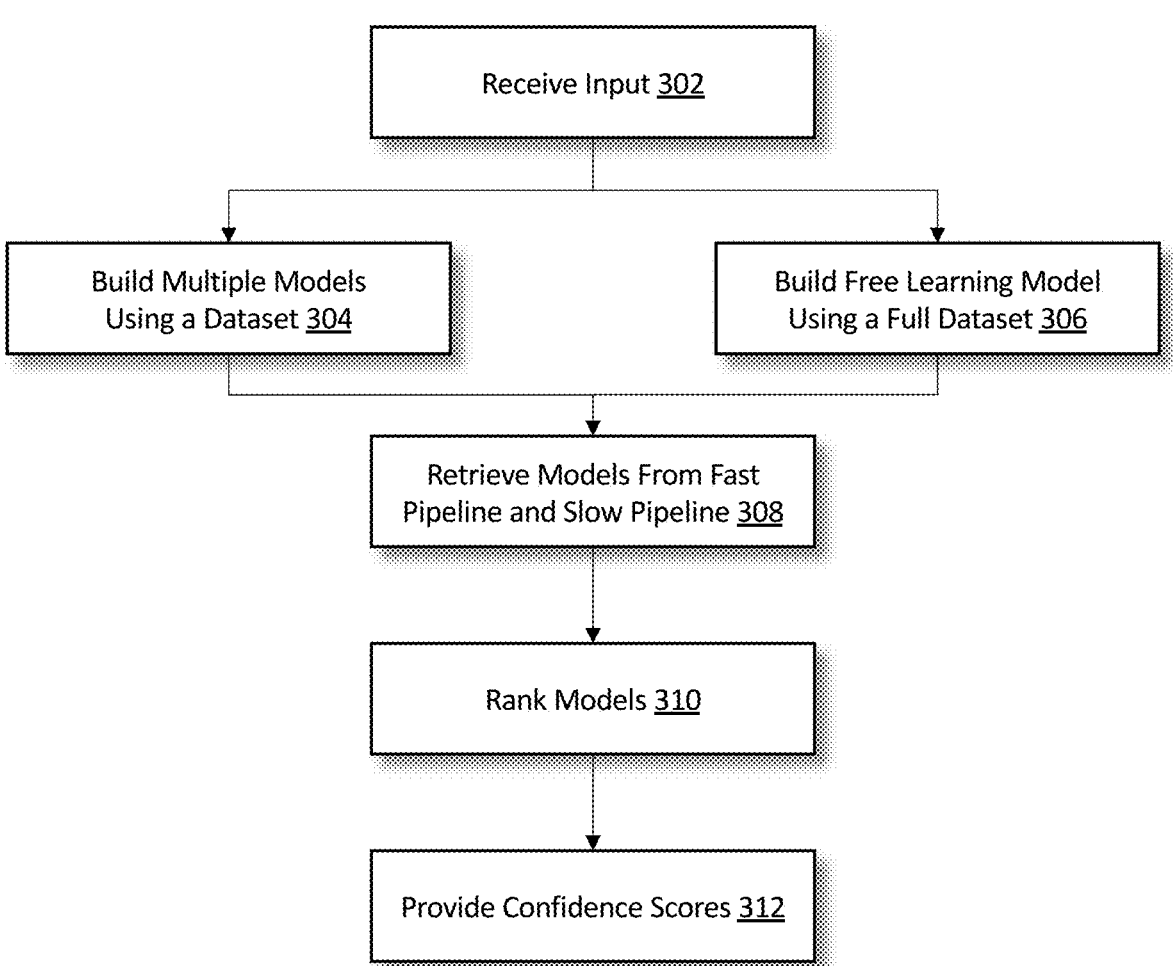

Referring now to FIG. 3, an operational flowchart illustrating the exemplary a self-improving Bayesian network learning process 300 that uses two split learning pipelines and is used by the network learning program 110a, 110b according to at least one embodiment is depicted.

At 302, an input is received. The input may be received from various sources and be stored in one or more databases. Input may include, for example, ontology data 206, taxonomy data, language modeling data, structured data, unstructured data, training data 202 and development data 204. Databases may be accessible to the public or if a user or a client has authenticated accessibility to private databases, the private databases may also be used to build a model, for example, a medical center accessing medical information or an insurance company accessing internal risk information to build models to create a better products or services for clients.

For example, the input received or obtained is a full set of data that may be used by the network learning program 110a, 110b, such as a set of rows in a large spreadsheet. Unstructured data may be converted to structured data for the purposes of this example. The input may be divided into two subsets, training data 202 and development data 204. The training data 202 may be used to train models and the development data 204 may be used as test data to measure the accuracy of the models. Thus, training data 202 and development data 204 may not be overlapping data. For example, the spreadsheet is partitioned such that % of the rows are used as training data 202 and the remaining ¼ of the rows are used as development data 204.

At 304, one or more models are built using a dataset. The dataset may, optionally, be a portion, a part or a section of the dataset. The dataset may also include some external sources of knowledge, such as ontology data, taxonomy data or language modeling data. The one or more models built using external sources may be considered Bayesian network models being built on the fast pipeline. The portion of the dataset may be a portion of the input and multiple portions may be created and used for model building. Multiple different portions may be identified and used to build multiple models. The portions may be obtained using a filtered subset of data based on the input data. The one or more models built using external sources may produce both fast and approximate models.

The fast pipeline 208 builds models quickly by taking one or more inputs, such as training data 202, external sources (e.g., ontology data 206, taxonomy data, and language models) and feedback data, or a combination of the inputs, and running or processing the inputs through a learning series or a model building series. The combination of inputs may be used to impose constraints by clustering or imposing connections on the features in the training dataset. The combination of inputs may, for example, include portions of the input data that have constraints imposed by clustering connections based on features of the dataset. The constraints on features allow one or more models to be quickly built and quickly provided as approximate Bayesian network models. The learning series or model building series uses an optional data sampler, a relationships recommender, a learning manager that includes a fast learner, a model evaluator and a feedback loop. The model accuracy may be evaluated based on the development dataset. The feedback loop may be used to improve the algorithm for creating constraints on the features.

The input data may be optionally split into model training and development sets that utilize multiple strategies to train one or more Bayesian network models. For example, 10% of the rows are used for testing (e.g., development data 204) and 90% are used for training (e.g., training data). Each model may have an associated accuracy score and a creation timestamp that are used for ranking models from both pipelines. The associated accuracy score may be calculated using, for example, the 10% of the rows used for testing. The creation timestamp provides a time element that shows how the accuracy of models change or adjust over time. Since models may be continually changing, the timestamp will help provide a better service to the user. For example, if a user or a customer can see that model B was created or updated at 2:00 pm on X date, then the customer will know if the model has changed or not compared to the last time the customer may have utilized model B.

The data sampler may use the input data or the training data 202 and select a portion of the training data to build a model. Selecting a portion may be optional. For example, both pipelines are capable of using a full dataset, however, the data sampler can optionally be used to filter the data. The fast pipeline 208 may compensate the smaller quantity of data by using constraints, by using ontologies to derive the constraints or by using faster and possibly less accurate algorithms in the fast pipeline. The training data 202 used to build a fast model may also use all of the input. For example, selecting a portion of the training data 202 may be accomplished using multiple methods such as by random sampling of the input, by filtering the most complete data or by sorting and filtering with a custom heuristic.

The relationship manager may impose relationships between variables or between clusters of variables of the training data 202. For example, the relationships manager imposes a cluster using the available metadata using only column headers of a comma separated values (CSV) file or a spreadsheet. The relationships manager may add relevant assumptions or constraints using, for example, ontologies, taxonomies or language models, or a combination of the assumptions or constraints. The relationships manager adds relevant assumptions or constraints to minimize the solution space size, thus, speeding up the Bayesian network learning phase.

A use case example may include an ontology that describes a biopsychosocial model and one possible clustering algorithm would group columns from the training data 202, such as the genetic or biochemical column is grouped as biology, mood and personality columns are grouped as mood, personality column is grouped as psychology and the cultural and familial columns are grouped as social. Each group is a cluster of nodes. As an additional and optional component, a feedback loop may be fed back into the relationships recommender by the model evaluator in the fast pipeline or the evaluator in the slow pipeline, or both, to improve the model and clustering assumptions. Over time, the fast pipeline may outperform the slow pipeline.

One instance that the fast pipeline may possibly outperform the slow pipeline may include the feedback provided by the comprehensive learner in the slow pipeline is used to allow more accurate model learning by leaning to generalize by avoiding overfitting on the training dataset. Overfitting may degrade model performance by feeding the Bayesian network model a large amount of training data such that the model learns too many details, such as the noise and inaccurate data. Underfitting may degrade model performance by the inability of the Bayesian network model to accurately depict the input data or the data trends.

The learning manager may receive an input as a set of constraints that were created by the relationships recommender. The learning manager may filter the set of constraints, for example, by guessing the training time associated with a subset of the constraints. Filtering the set of constraints may be an optional step. For example, filtering may be used depending on the quality of the data and on the quality of the ontologies. Filtering may also be used based on user preference, such as the user may prefer to use less constraints and more data. For each set of constraints received by the learning manager, the learning manager trains a model based on the limited solution space sped-up learning, thus, creating the fast learner. The learning manager may execute the learning process concurrently with the slow pipeline or the learning manager may be used to concurrently build more than one model at the same time in the fast pipeline 208, or both. The learning manager, as further learners or other learners, may also use less accurate but faster algorithms. Further learners may include any Bayesian network learner that is faster, such as a prototypical constraint (PC) algorithm or a Chow-Liu tree. As soon as a model becomes available from the learning manager, the model is provided as an output to the models evaluator. Each training instance may provide a model in a short amount of time, for example, from several milliseconds to several minutes depending on the use case.

The model evaluator may receive one or more different models as an input and over time, the model evaluator may test or validate the models using the development data 204. Using the development data 204, the model evaluator may compute the model accuracy, for example, using a log-likelihood estimate. The feedback loop within the fast pipeline 208 may be used, for example, when a domain expert provides feedback on the learned graph structure.

At 306, a free learning model is built using the full dataset. The model built using the full dataset may be considered the model being built on the slow pipeline 210. The slow pipeline builds models taking more time and built with higher accuracy by taking one or more inputs, such as training data 202, development data 204, and feedback data, and running or processing the inputs through a learning series or a model building series. The free learning model may produce a higher level of accuracy and take more time to build the Bayesian network model due to the model learning not relying on any external assumptions or constraints, thus, utilizing the full dataset. The model may be evaluated using the development dataset.

The comprehensive learner may perform free learning on the full training data 202. Free learning on the full training data 202 may include training a model without constraints or without assumptions. The free learning model may create a more accurate model output while using more time to create the output, given the size of the solution space caused by the lack of constraints. For example, the solution space may refer to the set of all possible graphs. The evaluator may test the learning and provide feedback to the relationships recommender in the fast pipeline 208 in order to re-train the model. The evaluator may use the development data 204 to score how well the model can predict data. The evaluator may evaluate the accuracy of the model created by the comprehensive learner using the development data 204.

For example, the input data is a spreadsheet that includes data relating to insured clients as rows and the clients are described across several variables, such as age, employment status, etc., as columns. One column includes a risk score that is computed by an insurance company for each individual. The rows are divided into training data 202 and development data 204. Some rows, the rows containing the training data 202, are used to train a model, used for the model to learn or used for the model learning phase. The remaining rows, the rows containing the development data 204, are used to test the model. For example, the model provides a prediction of the risk score for the individuals of the development data 204 based on all other columns except for the risk column. The model is then scored by comparing the score predicted by the model and the real score observed in the dataset.

Steps 304 and 306 are models that are being built concurrently in two separate model building pipelines.

At 308, models are retrieved from the two concurrent pipelines from steps 304 and 306. The outputs from the two pipelines are received at the model collector 212 as the models are transmitted out of each respective pipeline. For example, the model collector 212 may begin receiving models nearly immediately from the fast pipeline for a user to access. A model collector 212 may include a database the collects the built models from both pipelines, the fast pipeline 208 and the slow pipeline 210. The model collector 212 may return the output of both pipelines to the user and may include confidence scores for each model output. The user may be provided with a display on a computing devise with options on allowing the user to interact with the output models and output information. The consumer may choose a model based on the output and based on the consumer needs, for example, based on accuracy or based on time. The model collector 212 may collect models that reach a maximum accuracy across the built models from both pipelines that increases over time.

At 310, models are ranked. Models may be collected from the model collector 212 and ranked according to the associated confidence scores. Model ranking may include, for example, user input for a model ranking strategy, for debugging the model or for manually editing the model. The self-improving Bayesian network 200 may expose or make available the models collected over time. For example, the collected models may be ranked based on accuracy and only a given amount or number of the models may be kept and saved in memory space. The collected models may be available for a user to explore and filter the models based on metadata. In a streaming example, the collected models may be provided to an external system that can receive model collections and only expose the best model available and updating the model over time as the accuracy improves.

At 312, confidence scores are provided. Confidence scores may be provided for the ranked models. Confidence scores may be calculated using the model and the development data 204. Confidence scores may also be calculated based on additional input from the user.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
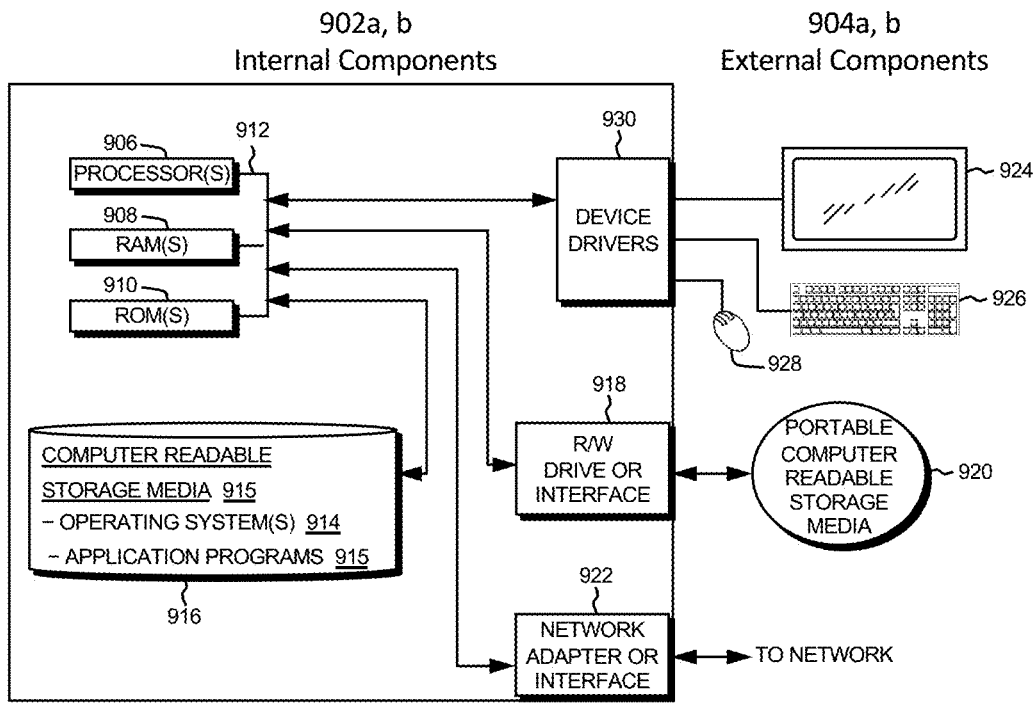
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 and server 112 may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914, with one or more application programs 915 and one or more computer readable storage media 915. The one or more operating systems 914, the software program 108, and the outage restoration prediction program 110*a* in client computer 102, and the outage restoration prediction program 110*b* in network server 112, may be stored on one or more computer readable storage media 915 for execution by one or more processors 906 via one or more RAMs 908 (which typically include cache memory). In the embodiment illustrated in FIG. 4, each of the computer readable storage media 915 is a magnetic disk storage device of an internal hard drive. Alternatively, each of the computer readable storage media 915 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the network learning program 110*a*, 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G/4G/5G wireless interface cards or other wired or wireless communication links. The software program 108 and the network learning program 110*a* in the computer 102 and the network learning program 110*b* in a network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the network learning program 110*a* in computer 102 and the network learning program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
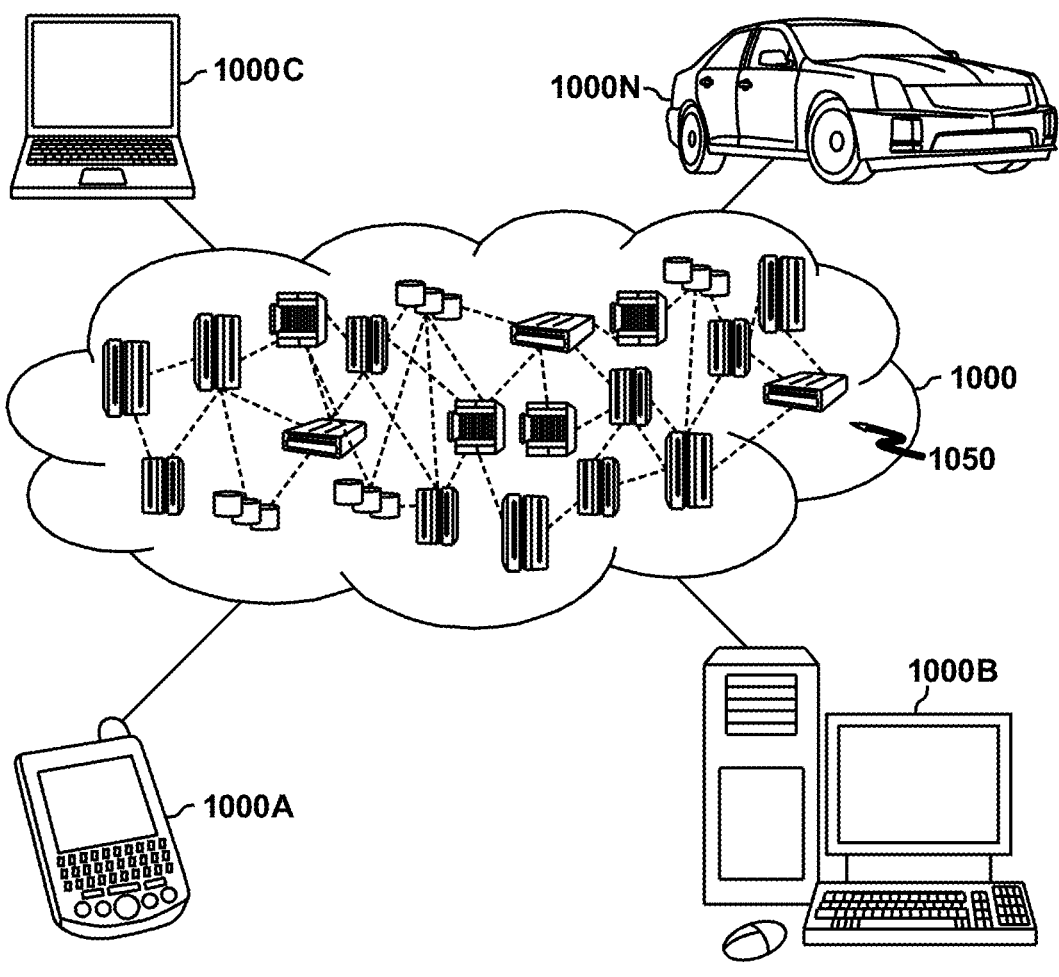
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, the cloud computing environment 1000 includes one or more cloud computing nodes 1050 with which local computing devices used by cloud consumers, such as, for example, personal digital assistant (PDA) or cellular telephone 1000A, desktop computer 1000B, laptop computer 1000C, and/or automobile computer system 1000N may communicate. Cloud computing nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 1050 and cloud computing environment 1000 can communicate with any type of computerized device over any type of network and/or network addressable connection (e.g., using a web browser).

Figure 6:
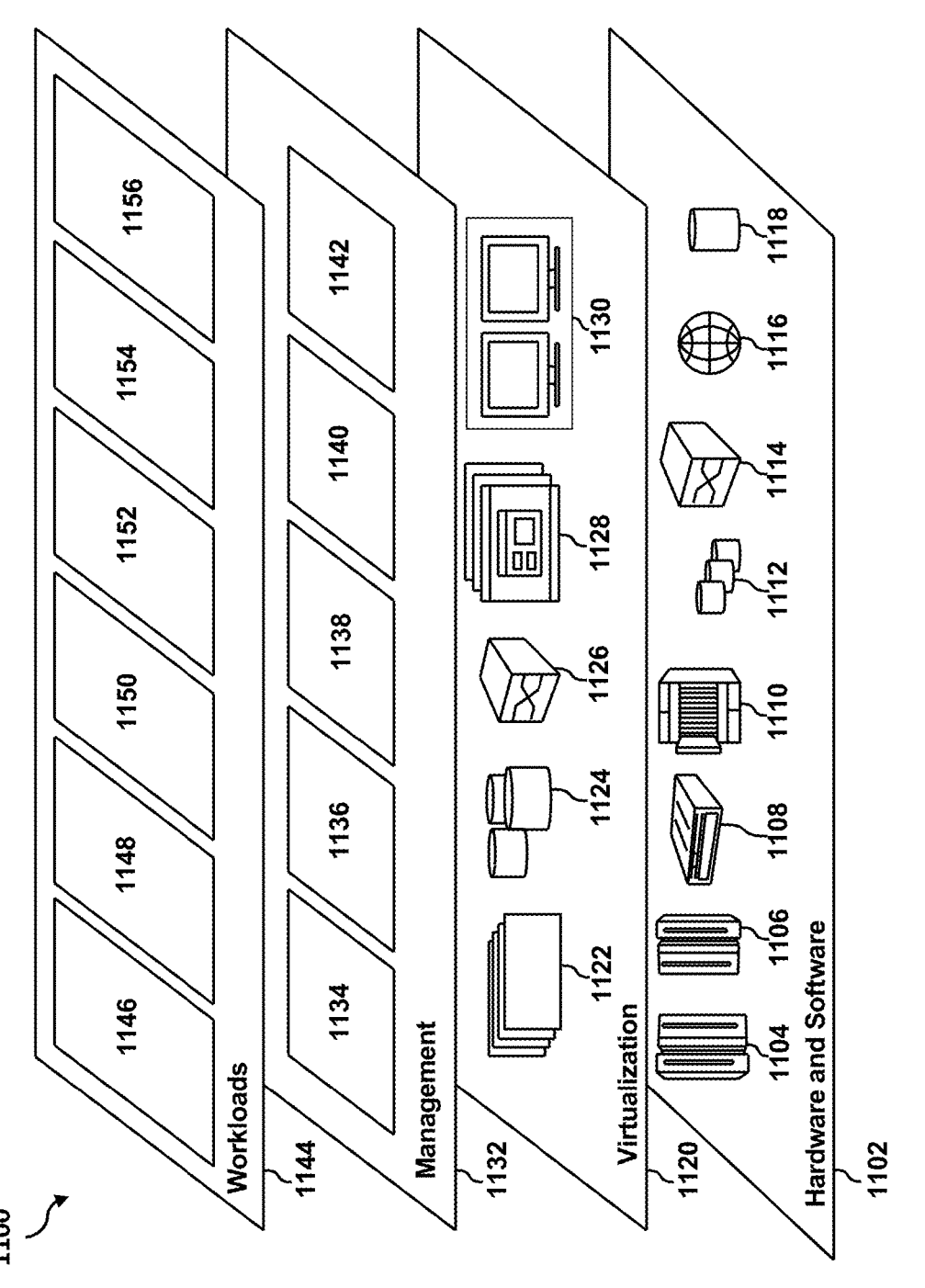
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

A hardware and software layer 1102 include hardware and software components. Examples of the hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, a management layer 1132 may provide the functions described below. Resource provisioning 1134 provides dynamic procurement of computing resources and other resources that are utilized to perform tasks within the cloud computing environment. Metering and pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions that may be provided from this layer include: mapping and navigation 1146; software development and lifecycle management 1148; virtual classroom education delivery 1150; data analytics processing 1152; transaction processing 1154; and network learning 1156. A network learning program 110$a$, 110$b$ provides a way to utilize two split learning pipelines in a Bayesian network to obtain accurate results.

The present invention may be a system, a method, and/or a computer program product at any possible technical detail level of integration. The computer program product may include a computer readable storage media 915 (or media) having computer readable program instructions thereon for causing a processor 906 to carry out aspects of the present invention.

The computer readable storage media 915 can be a tangible device that can retain and store instructions for use by an instruction execution device. The computer readable storage media 915 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage media 915 includes the following: a portable computer diskette, a hard disk, a random access memory (RAM) 908, a read-only memory (ROM) 910, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage media 915, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage media 915 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface 922 in each computing/processing device receives computer readable program instructions from the network and forwards the computer readable program instructions for storage in a computer readable storage media 915 within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor 906 of a general purpose computer, special purpose computer, or other programmable data processing apparatus to produce a machine, such that the instructions, which execute via the processor 906 of the computer or other programmable data processing apparatus, create means for implementing the functions/acts specified in the flowchart and/or block diagram block or blocks. These computer readable program instructions may also be stored in a computer readable storage media 915 that can direct a computer, a programmable data processing apparatus, and/or other devices to function in a particular manner, such that the computer readable storage media 915 having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improved training and inferences of a machine learning model by training two split machine learning pipelines asynchronously that learn at least in-part simultaneously using a network learning program and a model collector, the method comprising:

receiving input data, wherein the input data contains a full dataset;

training by the network learning program, one or more Bayesian network models using one or more portions of the full dataset on a first pipeline to speed up availability of inferences, the portions of the full dataset reducing the amount of data being utilized in training;

training by the network learning program a free learning model using the full dataset on a second pipeline asynchronously while and after the one or more Bayesian network models are trained, the free learning model more accurate than the one or more Bayesian network models but taking more time to train and, while the free learning model is being trained in an interim utilizing the trained one or more Bayesian network models;

retrieving using the model collector the one or more Bayesian network models from the first pipeline, and using the one or more trained Bayesian network models to make inferences in the interim while the free learning model is being trained with little or no downtime;

retrieving using the model collector the trained free learning model from the second pipeline when training of the free learning model is complete, and using the free learning model to make inferences more accurate than the inferences made by the one or more Bayesian network models; and returning by the model collector outputs of both pipelines to the user.

2. The method of claim 1, further comprising:

ranking the one or more Bayesian network models and the free learning model; and providing confidence scores based on the ranking.

3. The method of claim 1, wherein the input data includes training data and development data, wherein the training data is used for training purposes and development data is used for testing purposes.

4. The method of claim 1, wherein the first pipeline includes a data sampler, a relationships recommender, a learning manager, a model evaluator and a feedback loop.

5. The method of claim 1, wherein the second pipeline includes a comprehensive learner and an evaluator.

6. The method of claim 1, wherein the first pipeline trains the one or more Bayesian network models faster than the second pipeline by training the one or more Bayesian network models using one or more sets of constraints.

7. A computer system for improved training and inferences of a machine learning model by training two split machine learning pipelines asynchronously that learn at least in-part simultaneously using a network learning program and a model collector, the computer system comprising:

one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

receiving input data, wherein the input data contains a full dataset;

training by the network learning program, one or more Bayesian network models using one or more portions of the full dataset on a first pipeline to speed up availability of inferences, the portions of the dataset reducing the amount of data being utilized in training;

training by the network learning program a free learning model using the full dataset on a second pipeline asynchronously while and after the one or more Bayesian network models are trained, the free learning model more accurate than the one or more Bayesian network models but taking more time to train and, while the free learning model is being built trained in an interim utilizing the trained one or more Bayesian network models;

retrieving using the model collector the one or more trained Bayesian network models from the first pipeline, and using the one or more trained Bayesian network models to make inferences in the interim while the free learning model is being trained with little or no downtime;

retrieving using the model collector the trained free learning model from the second pipeline when training of the free learning model is complete, and using the free learning model to make inferences more accurate than the inferences made by the one or more Bayesian network models; and returning by the model collector outputs of both pipelines to the user.

8. The computer system of claim 7, further comprising:

ranking the one or more Bayesian network models and the free learning model; and providing confidence scores based on the ranking.

9. The computer system of claim 7, wherein the input data includes training data and development data, wherein the training data is used for training purposes and development data is used for testing purposes.

10. The computer system of claim 7, wherein the first pipeline includes a data sampler, a relationships recommender, a learning manager, a model evaluator and a feedback loop.

11. The computer system of claim 7, wherein the second pipeline includes a comprehensive learner and an evaluator.

12. The computer system of claim 7, wherein the first pipeline trains the one or more Bayesian network models faster than the second pipeline by training the one or more Bayesian network models using one or more sets of constraints.

13. A computer program product for improved training of a machine learning model by training two split machine learning pipelines asynchronously that learn at least in-part simultaneously using a network learning program and a model collector, the computer program product comprising:

one or more non-transitory computer-readable tangible storage media and program instructions stored on at least one of the one or more computer-readable tangible storage media, the program instructions executable by a processor to cause the processor to perform a method comprising:

receiving input data, wherein the input data contains a full dataset;

training by the network learning program, one or more Bayesian network models using one or more portions of the full dataset on a first pipeline to speed up availability of inferences, the portions of the full dataset reducing the amount of data being utilized in training;

training by the network learning program a free learning model using the full dataset on a second pipeline asynchronously while and after the one or more Bayesian network models are trained, the free learning model more accurate than the one or more Bayesian network models but taking more time to train and, while the free learning model is being trained in an interim utilizing the trained one or more Bayesian network models;

retrieving using the model collector the one or more Bayesian network models from the first pipeline, and using the one or more trained Bayesian network models to make inferences in the interim while the free learning model is being trained with little or no downtime;

retrieving using the model collector the trained free learning model from the second pipeline when training of the free learning model is complete, and using the free learning model to make inferences more accurate than the inferences made by the one or more Bayesian network models; and returning by the model collector outputs of both pipelines to the user.

14. The computer program product of claim 13, further comprising:

ranking the one or more Bayesian network models and the free learning model; and providing confidence scores based on the ranking.

15. The computer program product of claim 13, wherein the input data includes training data and development data, wherein the training data is used for training purposes and development data is used for testing purposes.

16. The computer program product of claim 13, wherein the first pipeline includes a data sampler, a relationships recommender, a learning manager, a model evaluator and a feedback loop.

17. The computer program product of claim 13, wherein the second pipeline includes a comprehensive learner and an evaluator.

18. The computer program product of claim 13, wherein the first pipeline trains the one or more Bayesian network models faster than the second pipeline by training the one or more Bayesian network models using one or more sets of constraints.

* * * * *